United States Patent
Brunner

(10) Patent No.: US 7,922,252 B2
(45) Date of Patent: Apr. 12, 2011

(54) VEHICLE SEAT WITH ADJUSTABLE HEAD RESTRAINT

(75) Inventor: Stefan Brunner, Freising (DE)

(73) Assignee: Lear Corporation, Southfield, MI (US)

( * ) Notice: Subject to any disclaimer, the term of this patent is extended or adjusted under 35 U.S.C. 154(b) by 112 days.

(21) Appl. No.: 12/145,594

(22) Filed: Jun. 25, 2008

(65) Prior Publication Data

US 2009/0033137 A1 Feb. 5, 2009

(30) Foreign Application Priority Data

Aug. 3, 2007 (DE) .......................... 10 2007 036 676

(51) Int. Cl.
A47C 7/36 (2006.01)

(52) U.S. Cl. ....................................... 297/410; 297/408

(58) Field of Classification Search .......... 297/408–410; 296/216.12
See application file for complete search history.

(56) References Cited

U.S. PATENT DOCUMENTS

| | | | |
|---|---|---|---|
| 5,918,940 A | | 7/1999 | Wakamatsu et al. |
| 6,364,415 B1 * | | 4/2002 | Mori et al. .................... 297/410 |
| 6,390,558 B2 * | | 5/2002 | Fischer et al. ................. 297/410 |
| 6,460,931 B2 * | | 10/2002 | Beck .............................. 297/410 |
| 6,550,856 B1 * | | 4/2003 | Ganser et al. ................... 297/61 |
| 6,733,079 B2 * | | 5/2004 | Gans et al. ..................... 297/410 |
| 6,871,913 B2 * | | 3/2005 | Malsch et al. ................. 297/410 |
| 7,210,734 B1 * | | 5/2007 | Yetukuri et al. ................. 297/61 |
| 7,523,987 B2 * | | 4/2009 | Yamaguchi ............... 297/216.12 |
| 2002/0079723 A1 | | 6/2002 | Risch et al. |
| 2005/0156456 A1 | | 7/2005 | Robinson et al. |
| 2006/0261661 A1 | | 11/2006 | Kraft et al. |
| 2008/0001456 A1 | | 1/2008 | Muller et al. |

FOREIGN PATENT DOCUMENTS

| | | |
|---|---|---|
| DE | 19648321 A1 | 6/1997 |
| DE | 19933507 A1 | 1/2001 |
| DE | 10104386 A1 | 7/2002 |
| DE | 10306079 A1 | 8/2004 |
| DE | 202004013029 U1 | 12/2004 |
| EP | 0965482 A1 | 12/1999 |
| GB | 2340744 A | 3/2000 |
| WO | 2006050990 A1 | 5/2006 |

OTHER PUBLICATIONS

German Office Action for corresponding German Application No. DE 10 2007 036 676.2, mailed Mar. 20, 2008, 3 pages.

* cited by examiner

*Primary Examiner* — David Dunn
*Assistant Examiner* — Erika Garrett
(74) *Attorney, Agent, or Firm* — Brooks Kushman P.C.

(57) ABSTRACT

A vehicle seat is disclosed with a seat bottom and a seat back. A guide is pivotally mounted to a frame of the seat back. A head restraint extends from the seat back and is mounted to the guide for translation along the guide at a first pivotal position of the guide and for being secured to the guide at a second pivotal position of the guide. A slider is disclosed for sliding upon the guide and for supporting the head restraint. A biasing member is disclosed for urging the head restraint to a retracted position. A release mechanism is provided for rotating the guide shaft and retracting the head restraint for manual adjustment or for tilt of the seat back.

21 Claims, 4 Drawing Sheets

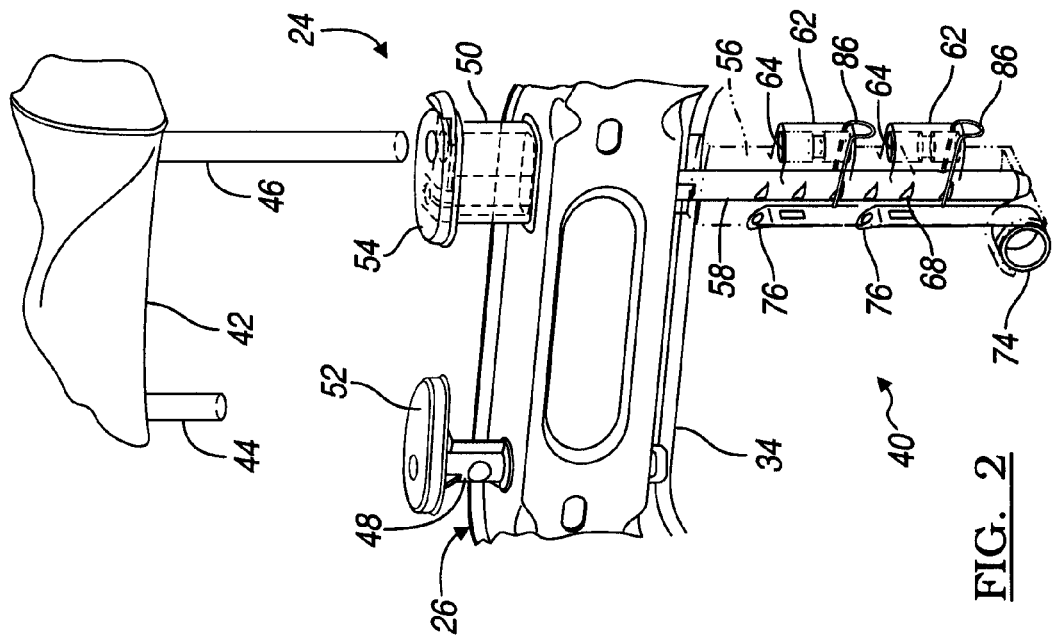
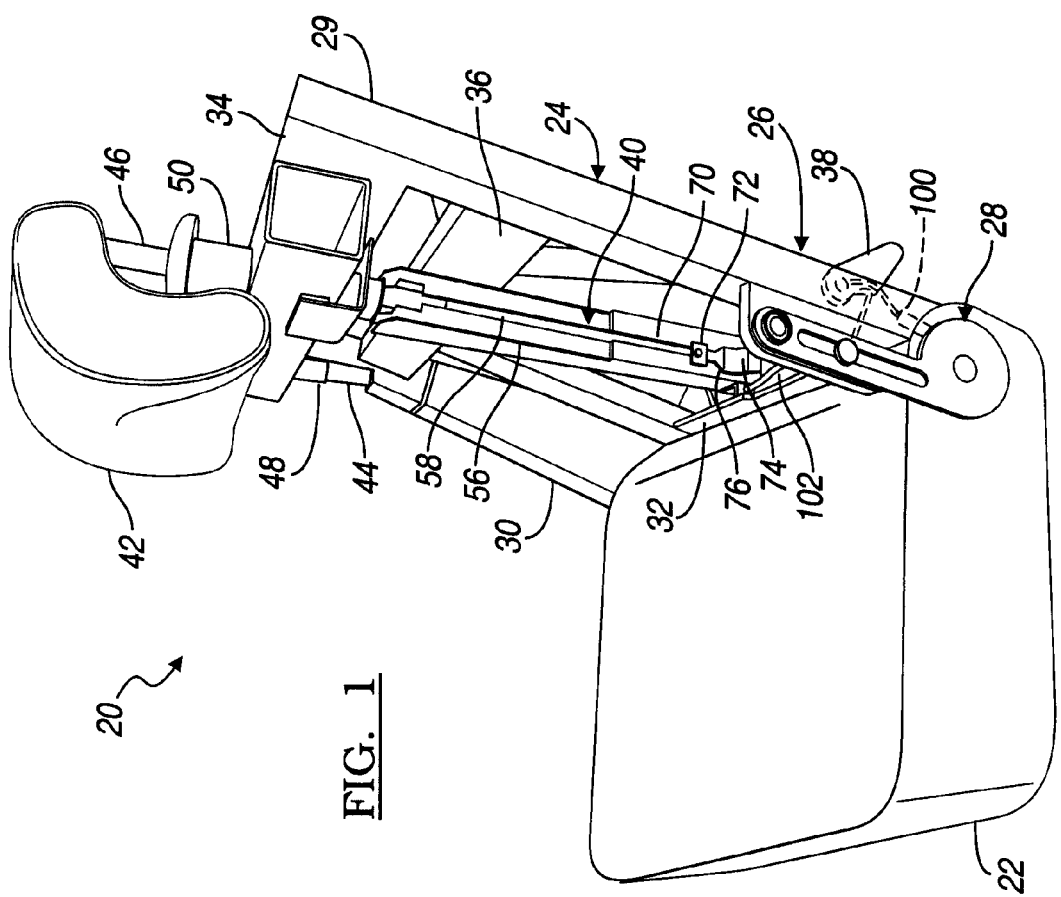

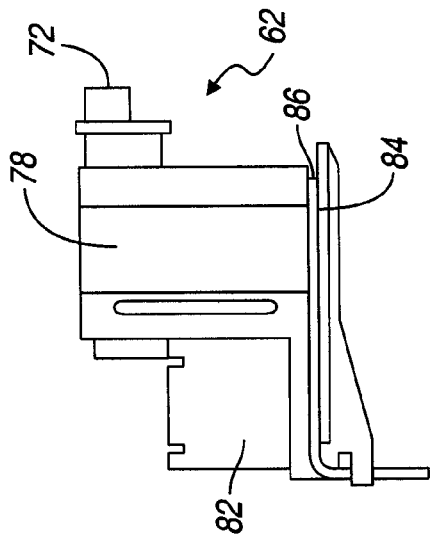
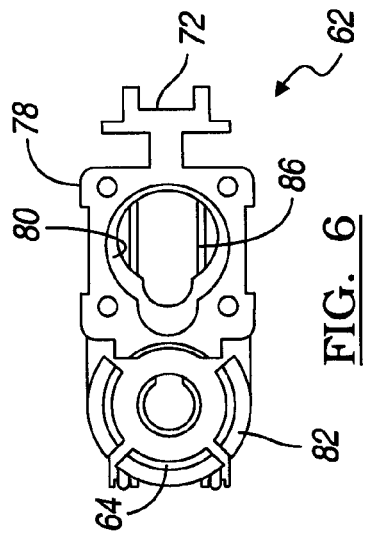
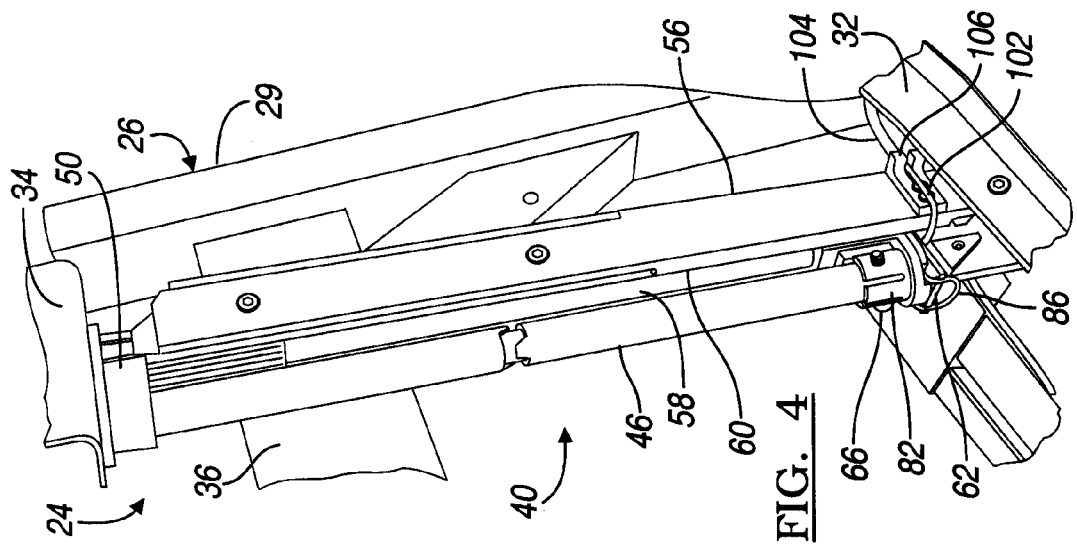
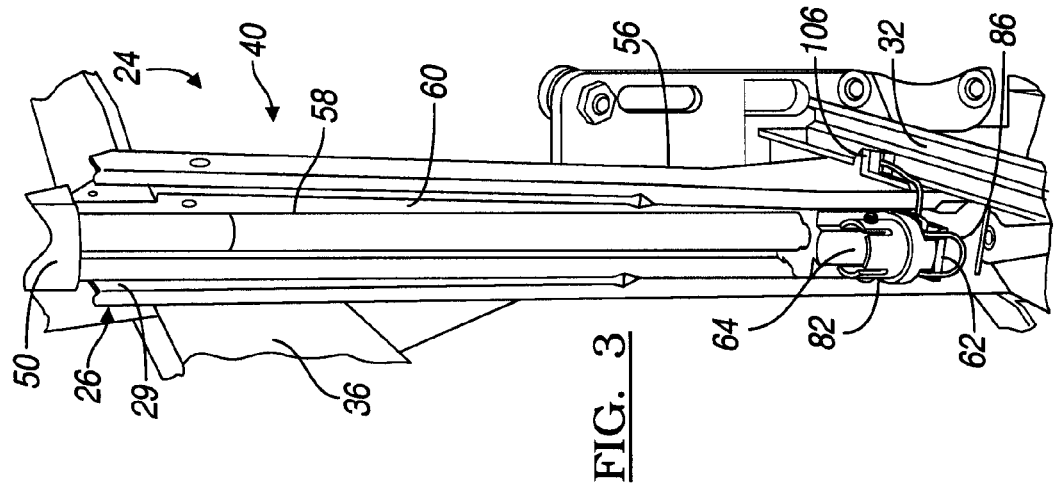

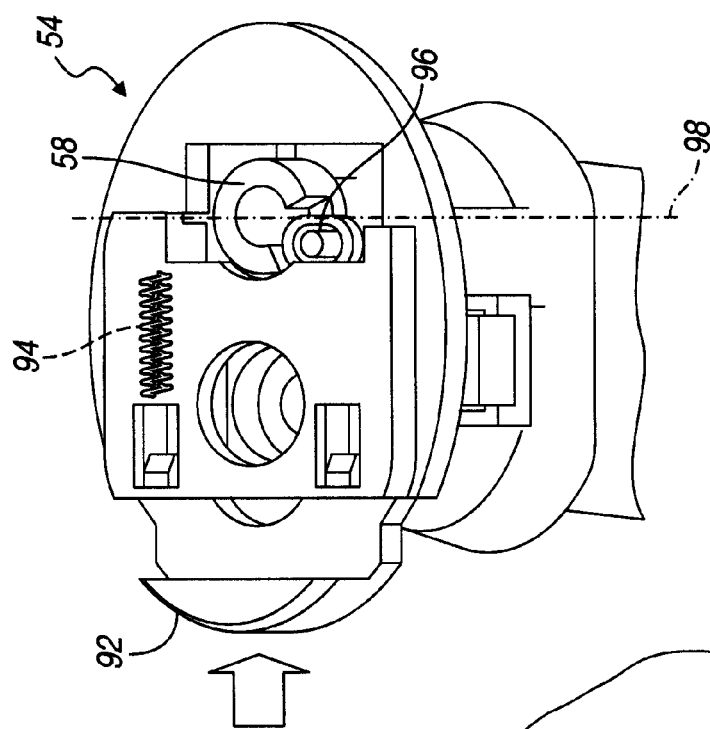
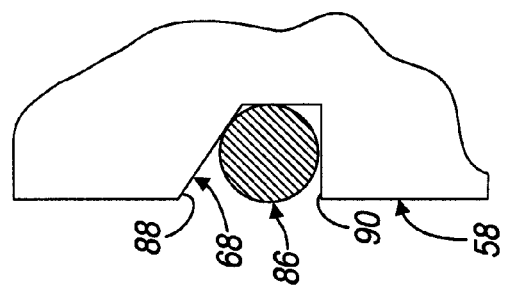
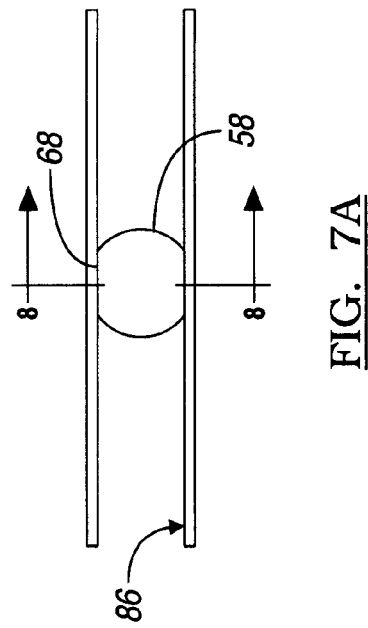
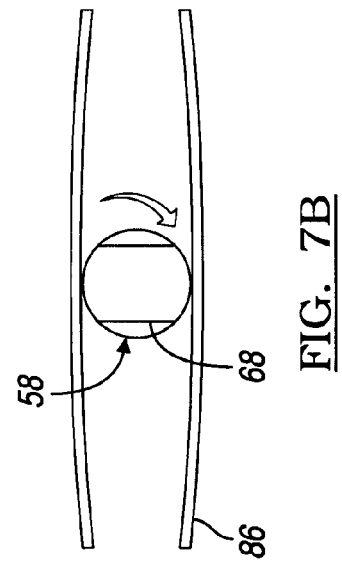
FIG. 9
FIG. 8
FIG. 7A
FIG. 7B

VEHICLE SEAT WITH ADJUSTABLE HEAD RESTRAINT

CROSS-REFERENCE TO RELATED APPLICATIONS

This application claims foreign priority benefits under 35 U.S.C. §119(a)-(d) to DE 10 2007 036 676.2, filed Aug. 3, 2007, which is hereby incorporated by reference in its entirety.

BACKGROUND OF THE INVENTION

1. Field of the Invention

The present invention relates to vehicle seat with adjustable head restraints.

2. Background Art

Various vehicle seats having height adjustable head restraints are disclosed in the art. Vehicle seats having retractable head restraints are also known in the art. One vehicle seat example is U.S. Pat. No. 6,390,558 B2, which issued to Fischer et al. on May 21, 2002. Another vehicle seat example is U.S. Patent Application Publication No. 2002/0079723 A1, which published to Risch et al. on Jun. 27, 2002. The disclosures of these references are incorporated in their entirety by reference herein.

BRIEF DESCRIPTION OF THE DRAWINGS

FIG. 1 is a perspective view of a partially assembled vehicle seat in accordance with the present invention;

FIG. 2 is a partially exploded perspective view of a portion of the vehicle seat of FIG. 1, illustrating a height adjustment assembly for a head restraint of the vehicle seat;

FIG. 3 is a partially assembled perspective view of a portion of the vehicle seat of FIG. 1, illustrating a portion of the height adjustment assembly;

FIG. 4 is another partially assembled perspective view of the vehicle seat of FIG. 1, illustrating a portion of the height adjustment assembly;

FIG. 5 is a side elevation view of a mechanism of the height adjustment assembly of FIG. 2;

FIG. 6 is a top plan view of the mechanism of FIG. 5;

FIG. 7a is a top plan view of a mechanism of the height adjustment assembly of FIG. 2 illustrated in a first position;

FIG. 7b is a top plan view of the mechanism of FIG. 7a, illustrated in a second position;

FIG. 8 is a partial section view taken along section line 8-8 in FIG. 7a;

FIG. 9 is a perspective view of a release mechanism of the height adjustment assembly of FIG. 2;

DETAILED DESCRIPTION OF EMBODIMENTS OF THE INVENTION

Figure 10:
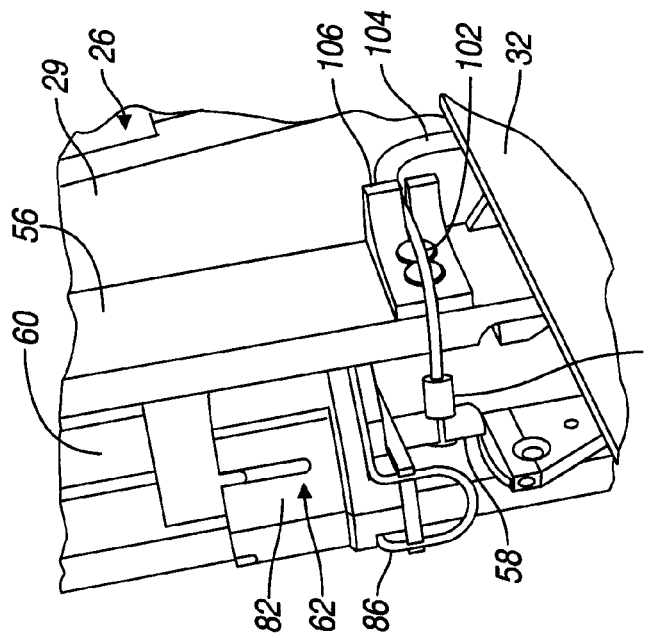
FIG. 10 is a perspective view of a portion of another release mechanism of the height adjustment assembly of FIG. 2.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIG. 1, a vehicle seat is illustrated and referenced generally by numeral 20 for use in a vehicle, such as an automobile, a boat or an aircraft. The seat 20 includes a seat bottom 22 that is mounted within the vehicle. The seat 20 also includes a seat back 24 that is mounted to one of the seat bottom 22 or the vehicle. The seat back 24 is illustrated partially disassembled with cushioning and a cover removed for revealing underlying components of the seat back 24. The seat back 24 includes a frame 26, which in the embodiment depicted is pivotally connected to the seat bottom 22 by a tilt mechanism 28.

The vehicle seat 20 may be provided anywhere within an associated vehicle, such as a front row seat, a second row seat, or the like. The seat bottom 22 may be mounted directly to the vehicle floor or coupled to seat adjuster mechanisms or rails extending longitudinally to the vehicle floor and enabling longitudinal, height, and angular adjustment of the seat bottom 22 relative to the vehicle floor. The seat bottom 22 is conventional in design and can be constructed in accordance with any suitable manner, including a structural frame covered by a foam pad layer and other finish cover material.

The frame 26 is formed from any suitable material that is sufficiently light in weight, yet structurally sound for supporting the occupant and for withstanding appropriate testing requirements. The frame 26 includes a pair of side members 29, 30, which are connected by a lower cross member 32, an upper cross member 34 and an intermediate cross member 36. In the description, various embodiments and operating parameters and components of the embodiments are described with directional language such as "left", "right", "above", "below", "upper", "lower", and words of similar import designate directions shown in the drawings or are understood in the field of the art. Such directional terminology is used for relative description and clarity and is not intended to limit the orientation of any embodiment, or component of an embodiment to a particular direction or orientation.

The frame members 29, 30, 32, 34, 36 can be formed integrally or from separate components that are joined by any suitable manner, such as welding, stamping, fastening or the like to form the frame 26. The frame 26 is subsequently covered with foam or cushioning and a cover material to support the occupant. The side members 29, 30 are connected to the seat bottom 22 by the tilt mechanism 28. The tilt mechanism 28 is operated by the lever 38 on the back of the seat back 24. The tilt mechanism 28 may be any suitable mechanical or electro-mechanical reclining mechanism. For example, the tilt mechanism 28 may be embodied by the reclining mechanisms of the Fischer et al. U.S. Pat. No. 6,390,558 or the Risch et al. U.S. 2002/0079723 A1 patent application publication, which have been incorporated by reference herein.

A height adjustment assembly 40 is connected to the frame 26 and a head restraint 42 is mounted to the height adjustment assembly 40 and oriented above the seat back 24 for supporting the head of an occupant. Referring now to FIG. 2, the cooperation of the height adjustment assembly 40, head restraint 42 and frame 26 is illustrated in greater detail. The head restraint 42 includes a pair of rods 44, 46 extending therefrom. The frame 26 includes a pair of sleeves 48, 50 each mounted to the upper cross member 34. The sleeves 48, 50 each include an end cap 52, 54 that is disposed above the seat back 24 over an external cover. The rods 44, 46 are each received within one of the sleeves 48, 50 for linear translation of the head restraint 42 relative to the frame 26. One rod 44, has a length sufficient to cooperate within the sleeve 48 along the travel of height adjustment of the head restraint 42. The other rod 46 has a length to extend through the sleeve 50 and cooperate with the height adjustment mechanism 40.

Referring now to FIGS. 1 and 2, the height adjustment assembly 40 includes a housing 56 extending between the upper cross member 34 and the lower cross member 32. The housing 56 is illustrated in phantom in FIG. 2 to reveal underlying components of the height adjustment assembly 40. A guide shaft 58 is mounted in the housing 56 to pivot relative to the housing 56.

Referring now to FIGS. 2 and 3, the housing 56 includes an opening 60 adjacent to the guide shaft 58. The height adjustment assembly 40 includes a slider 62 mounted to the guide shaft 58 for translating along the guide shaft 58. The slider 62 extends out of the housing 56 through the opening 60. The invention contemplates that the slider 62 may extend through either lateral side of the housing 56, such as the outboard lateral side depicted in FIG. 2 or the inboard lateral side depicted in FIG. 3. The longer head restraint rod 46 extends through the corresponding sleeve 56 and is mounted within a bore 64 formed in the slider 62 as illustrated in FIG. 4. The slider 62 may be fastened to the head restraint rod 46 by a mechanical fastener 66 extending through the slider 62 and the head restraint rod 46.

With reference again to FIG. 2, the slider 62 cooperates with the guide shaft 58 and the housing 56 to translate along the guide shaft 58. Consequently, the head restraint 42 translates relative to the frame 26 as the slider 62 is translated along the guide shaft 58. The guide shaft 58 includes a plurality of notches 68 for locking the slider 62 in various axial positions along the guide shaft 58.

Referring again to FIG. 1, the housing 56 includes a slot 70 formed therethrough, which provides a track for the slider 62. The slider 62 includes a bracket 72 that extends through the slot 70 and is mounted to a spring 74. Referring to FIG. 2, the spring 74 is a torsion spring pivotally connected to the housing 56 with a distal end 76 mounted to the slider 62 to urge the slider 62 to a lowermost position on the guide shaft 58 and the housing 56. The spring 74 urges the slider 62 to the lowermost position for retracting the head restraint 42 when the slider 62 is unlocked from the guide shaft 58.

FIGS. 5 and 6 illustrate the slider 62 in greater detail. The slider 62 has a body 78 that is shaped to fit within the housing 56 and translate axially within the housing 56. A bore 80 is formed through the body 78 for receiving the guide shaft 58. A receiver 82 extends out of the opening 60 and the housing 56. The bore 64 for receiving the head restraint rod 46 is formed in the receiver 82. The bracket 72 extends from the body 78 and is T-shaped to extend through the slot 70 and the housing 56 and for translation along the slot 70. A pair of transverse slots 84 are formed through the body 78 and intersect the bore 80 for the guide shaft 58. A wire spring 86 is mounted to the body 78 with two transverse portions extending through the transverse slots 84 and one intermediate portion extending past the receiver 82. The wire spring 86 engages the guide shaft 58 to extend within the notches 68 formed on the guide shaft 58.

Referring now to FIGS. 7a and 7b, the cooperation of the wire spring 86 and the guide shaft 58 is illustrated in greater detail. The notches 68 are formed in opposed lateral sides of the guide shaft 58. In a first locked position of the guide shaft 58, the wire spring 86 transverse portions extend through the notches 68 for locking the slider 62 and head restraint 42 relative to the guide shaft 58. In order to unlock the slider 62 and head restraint 42 from the guide shaft 58, the guide shaft 58 is rotated approximately ninety degrees as illustrated in FIG. 7b. As the guide shaft 58 is rotated, notches 68 become disengaged from the transverse portions of the wire spring 86 by an external diameter of the guide shaft 58 that urges the wire spring 86 transverse portions outward as illustrated in FIG. 7b.

Referring now to FIG. 8, one of the notches 68 is illustrated in greater detail. The notch 68 includes a leading edge 88 and a locking edge 90. The locking edge 90 prevents further upward travel of the wire spring 86, and consequently the slider 62 and head restraint 42 along the guide shaft 58. Thus, locking edges 90 lock the wire spring 86 in predefined notch 68 positions along the guide shaft 58. For example, the locking edge 90 can be provided on both edges of the uppermost notch 68 along the guide shaft 58 to prevent inadvertent removal of the head restraint 42 and to prevent manual translation of the head restraint 42 to a position that would disconnect the slider 62 from the guide shaft 58. Likewise, each intermediate notch 68 may be provided with the locking edge 90 on the lowermost edge to lock the slider 62 in position and to prevent the torsion spring 74 from returning the slider 62 and head restraint 42 to the retracted position, thereby locking the wire spring 86 at each notch 68 position along the guide shaft 58.

The leading edges 88 are provided at an upper edge of each notch 68, except the uppermost notch 68, to permit the user to adjust the head restraint 42 upward by translating the head restraint 42 upward without pivoting the guide shaft 58. Thus, the user may adjust the head restraint 42 height upward by manually applying an upward force on the head restraint 42 thereby unlocking the slider 62 by urging the wire spring transverse portions 86 along the leading edges 88 and about the guide shaft 58 until engaging the next sequential notch 68 or the uppermost notch 68. In order to move the head restraint 42 downward, towards or to the retracted position, the user must rotate the guide shaft 58 approximately ninety degrees as illustrated in FIG. 7b. Once the guide shaft 58 is rotated, the torsion spring 74 urges the slider 62 and the head restraint 42 downward until it reaches the retracted position illustrated in FIG. 1.

Referring now to FIG. 9, the end cap 54 is illustrated in greater detail. The end cap 54 includes a push knob 92 mounted for linear translation in a lateral direction. A coil compression spring 94 is mounted in the end cap 54 to urge the push knob 92 to a laterally outboard position as illustrated in FIG. 9. The push knob 92 is pivotally connected to a pivotal projection 96 provided on the guide shaft 58 radially offset from an axis 98 about which the guide shaft 58 pivots.

Once the user pushes the push knob 92 towards the end cap 54 as illustrated by the arrows in FIG. 9, the push knob 92 rotates the guide shaft 58 approximately ninety degrees thereby unlocking the slider 62 whereby the torsion spring 74 consequently returns the head restraint 42 to the retracted position. Thus, the height of the head restraint 42 can be adjusted with only one hand. Unlike prior art devices that require one hand to move the head restraint and another hand to unlock the head restraint, the head restraint 42 can be raised by merely urging the head restraint 42 upwards. The head restraint 42 can be lowered by actuation of the push knob 92.

Various seating configurations require occupants to tilt or collapse the seat back relative to the seat bottom. For example, in two door vehicles with two rows of seating, the seat back may require to be tilted forward for occupant ingress and egress to and from a rear seating row. Other seating arrangements may require a seat to be folded, where the seat back lies flat across a seat bottom and then flipped, so the seat back and seat bottom are collectively pivoted about a pivotal connection of the seat bottom to the vehicle floor. Alternatively, the seat back can be collapsed, wherein the seat back is folded upon the seat bottom and the seat is subsequently removed from the vehicle or stowed in the vehicle. Many of these operations may require the head restraint 42 to be lowered for clearance within the vehicle, for compactness when folding, or for compactness when storing the seat or removing the seat from the vehicle.

Referring again to FIG. 1, in order to retract the head restraint 42 in response to an operation that results in the seat back 24 being tilted forward, the seat back release lever 38 can be utilized for disengaging the tilt mechanism 28 and for unlocking the guide shaft 58. The seat back release lever 38 is pivotally connected to the side member 29 and drives a cable 100 for disengaging the tilt mechanism 28. Likewise, the lever 38 is connected to another cable 102 that extends across the lower cross member 32 and cooperates with the height adjustment assembly 40.

Figure 11:
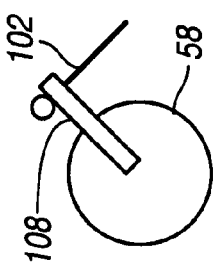
FIG. 11 is a bottom view of the portion of the release mechanism of FIG. 10.
Figure 12:
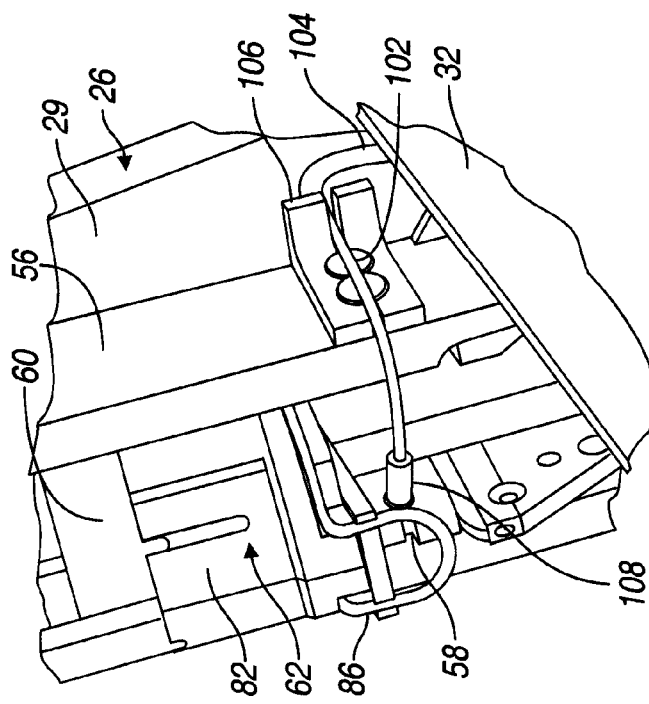
FIG. 12 is a perspective view of the portion of the release mechanism of FIG. 10, illustrated in a second position.
Figure 13:
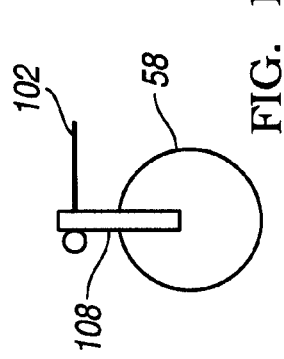
FIG. 13 is a bottom view of the portion of the release mechanism of FIG. 12.

Referring now to FIGS. 10-12, the cable 102 of the illustrated embodiment is a Bowden cable with a sheath 104 that terminates at a bracket 106 mounted to the housing 56. As illustrated in FIGS. 10 and 12, the guide shaft 58 extends through the slider 62. A lever 108 extends radially from the guide shaft 58 and is connected to the cable 102. Thus, in the locked orientation of the guide shaft 58, as illustrated in FIGS. 10 and 11, the slider 62 is locked to one of the notches 68 formed in the guide shaft 58. Once the seat back release lever 38 is actuated, the cable 102 is translated within the sheath 104 and the lever 108 is rotated to the positions illustrated in FIGS. 12 and 13 thereby pivoting the guide shaft 58 and unlocking the slider 62. Thus, when an occupant actuates the seat back release lever 38, the guide shaft 58 is pivoted to the unlock position and the torsion spring 74 urges the slider 62 to a lowermost position thereby retracting the head restraint 42. Therefore, the occupant can unlatch the seat back 24, tilt the seat back 24, and retract the head restraint 42 all with one hand.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for supporting an occupant comprising:
   a seat bottom;
   a seat back mounted relative to the seat back and extending upward therefrom, the seat back including a frame;
   a guide pivotally mounted to the seat back frame;
   a head restraint extending from the seat back and mounted to the guide for translation along the guide at a first pivotal position of the guide and for being secured to the guide at a second pivotal position of the guide; and
   a slider mounted to the guide to translate along the guide, the head restraint being fixed to the slider;
   wherein the guide further comprises a track fixed to the seat back frame, and the slider is mounted for translation along the track.

2. The vehicle seat of claim 1 wherein the guide further comprises a shaft pivotally connected to the seat back frame.

3. The vehicle seat of claim 1 wherein the guide includes a plurality of notches formed therein for providing a series of height adjustment positions of the head restraint.

4. The vehicle seat of claim 1 further comprising at least one head restraint rod extending from the head restraint into the seat back and fixed to the slider.

5. The vehicle seat of claim 1 further comprising a biasing member connected to the seat back frame and the slider to translate the slider in a downward direction in the second position of the guide to thereby retract the head restraint to the seat back.

6. The vehicle seat of claim 5 wherein the biasing member further comprises a torsion spring.

7. The vehicle seat of claim 5 further comprising a release mechanism mounted to the seat back frame in cooperation with the guide for rotating the guide to the second position thereby retracting the head restraint to the seat back.

8. The vehicle seat of claim 1 wherein the guide further comprises a shaft pivotally connected to the seat back frame with a plurality of notches formed therein for providing a series of height adjustment positions of the head restraint; and
   wherein the vehicle seat further comprises a biasing member mounted to the slider in engagement with the shaft to be received within one of the notches for securing the head restraint at a height position relative to the seat back, such that rotation of the shaft urges the biasing member out of the notch for height adjustment of the head restraint.

9. The vehicle seat of claim 8 wherein the biasing member further comprises a wire spring.

10. The vehicle seat of claim 8 wherein the plurality of notches are formed on opposed sides of the shaft, and wherein the biasing member further comprises a pair of biasing members in engagement with opposed sides of the shaft.

11. The vehicle seat of claim 1 further comprising a release mechanism mounted to the seat back frame in cooperation with the guide for rotating the guide to the second position for permitting height adjustment of the head restraint.

12. The vehicle seat of claim 11 wherein the release mechanism is connected to the guide at a radial position of the guide to rotate the guide relative to the seat back frame.

13. The vehicle seat of claim 12 wherein the release mechanism further comprises a push knob mounted for translation at a top of the seat back frame.

14. The vehicle seat of claim 12 wherein the release mechanism further comprises a lever mounted to a back of the seat back frame and a cable connecting the lever and the guide.

15. A vehicle seat for supporting an occupant comprising:
   a seat bottom;
   a seat back mounted relative to the seat back and extending upward therefrom, the seat back including a frame;
   a guide pivotally mounted to the seat back frame;
   a head restraint extending from the seat back and mounted to the guide for translation along the guide at a first pivotal position of the guide and for being secured to the guide at a second pivotal position of the guide;
   a biasing member connected to the seat back frame and the head restraint to translate the slider in a downward direction in the second position of the guide to thereby retract the head restraint to the seat back;
   a push knob mounted for translation at a top of the seat back frame in cooperation with the guide for rotating the guide to the second position thereby retracting the head restraint to the seat back;
   a lever mounted to a back of the seat back frame; and a cable connecting the lever and the guide so that actuation of the lever translates the cable for rotating the guide to the second position thereby retracting the head restraint to the seat back.

16. The vehicle seat of claim 15 further comprising a reclining mechanism connecting the seat back to the seat bottom for adjusting a tilt or recline of the seat back to the seat bottom, wherein the reclining mechanism is actuated by the lever.

17. A vehicle seat for supporting an occupant comprising:
a seat bottom;
a seat back mounted relative to the seat back and extending upward therefrom, the seat back including a frame;
a guide pivotally mounted to the seat back frame;
a slider mounted to the guide to translate along the guide;
a pair of sleeves mounted to a top region of the seat back frame;
a pair of rods each extending through the sleeves and above the seat back frame for translation relative to the sleeves, one of the pair of rods being fixed to the slider for translation along the guide; and
a head restraint mounted to the pair of rods for translation along the guide at a first pivotal position of the guide and for being secured to the guide at a second pivotal position of the guide.

18. The vehicle seat of claim 17 wherein the guide further comprises a shaft pivotally connected to the seat back frame with a plurality of notches formed on opposed sides of the shaft for providing a series of height adjustment positions of the head restraint; and
wherein the vehicle seat further comprises a pair of biasing members mounted to the slider in engagement with the opposed sides of the shaft to be received within a pair of the notches for securing the head restraint at a height position relative to the seat back, such that rotation of the shaft urges the pair of biasing members out of the pair of notches for height adjustment of the head restraint.

19. A vehicle seat for supporting an occupant comprising:
a seat bottom;
a seat back mounted relative to the seat back and extending upward therefrom, the seat back including a frame;
a guide pivotally mounted to the seat back frame;
a head restraint extending from the seat back and mounted to the guide for translation along the guide at a first pivotal position of the guide and for being secured to the guide at a second pivotal position of the guide;
a slider mounted to the guide to translate along the guide, the head restraint being fixed to the slider; and
a biasing member connected to the seat back frame and the slider to translate the slider in a downward direction in the second position of the guide to thereby retract the head restraint to the seat back.

20. A vehicle seat for supporting an occupant comprising:
a seat bottom;
a seat back mounted relative to the seat back and extending upward therefrom, the seat back including a frame;
a guide pivotally mounted to the seat back frame;
a head restraint extending from the seat back and mounted to the guide for translation along the guide at a first pivotal position of the guide and for being secured to the guide at a second pivotal position of the guide; and
a slider mounted to the guide to translate along the guide, the head restraint being fixed to the slider;
wherein the guide further comprises a shaft pivotally connected to the seat back frame with a plurality of notches formed therein for providing a series of height adjustment positions of the head restraint; and
wherein the vehicle seat further comprises a biasing member mounted to the slider in engagement with the shaft to be received within one of the notches for securing the head restraint at a height position relative to the seat back, such that rotation of the shaft urges the biasing member out of the notch for height adjustment of the head restraint.

21. A vehicle seat for supporting an occupant comprising:
a seat bottom;
a seat back mounted relative to the seat back and extending upward therefrom, the seat back including a frame;
a guide pivotally mounted to the seat back frame;
a head restraint extending from the seat back and mounted to the guide for translation along the guide at a first pivotal position of the guide and for being secured to the guide at a second pivotal position of the guide; and
a release mechanism mounted to the seat back frame in cooperation with the guide for rotating the guide to the second position for permitting height adjustment of the head restraint.

* * * * *